Patented Feb. 4, 1930

1,746,100

UNITED STATES PATENT OFFICE

GEORGE C. F. BRUENS, OF LOUISVILLE, KENTUCKY

PROCESS OF DRESSING POULTRY AND FOWLS

No Drawing.   Application filed April 9, 1928. Serial No. 268,804.

In order to purchase poultry at that time of the year when the supply is most abundant, and the price the lowest, it has been customary for those engaged in the poultry business to make their purchases during the fall and then have the poultry and fowls placed in cold storage until such time as they are required for food.

It has been customary, for example, in dressing fowls in the manner called "New York dressed" to cut the jugular vein in the neck of the bird and let it hang for a short time and to then dry pluck the feathers. After this treatment the fowls are placed in cold storage and frozen until such time as they are required for consumption, when they are thawed out and cleaned.

My invention relates to a novel method of dressing poultry and fowls in which they are thoroughly washed and cleaned prior to being placed in cold storage.

It is the object of my invention to provide a novel process for first plucking the birds and then thoroughly removing all blood from the carcasses and thoroughly cleaning them so that when placed in cold storage, no discoloration or deterioration in the flavor of the meat occurs due to what may be called blood pockets.

The above and other objects to which reference will be made in the ensuing disclosure I accomplish by that certain combination of steps which are preferably carried out in the sequence suggested.

The chicken, duck, quail, or other fowl to be dressed is first killed by chopping off the head. The deheaded bird is then thrown into a basket having a perforated bottom through which all blood which drains from the carcass will drain until the bird is dead and thoroughly "kicked out." The blood which drains out is caught in a basin surrounding the basket and is subsequently worked up for a high protein stock food.

I next scald the bird in a water bath heated to a temperature of about 200 degrees Fahrenheit. I preferably add to the water bath a strong soap solution which softens the base of the feathers so that they may be easily plucked, and which also bleaches and removes all stains and dirt from the meat. Because of the temperature of the water bath it is thought that this sterilizing operation will thoroughly remove all bacteria which might cause deterioration during storage.

The fowls are then picked and, after picking, placed in a cool water bath. After soaking in the water bath until the temperature of the carcasses has cooled down to about that of the water, the birds are placed back on the dressing tables and the entrails are removed. In order to expedite the removal of the entrails the fowls are split, with a knife, down the back and the backbone removed. This cutting allows the carcass to be opened up for the ready removal of the entrails. The entrails are subsequently worked up into different by-products. The ground head, feet, backbone, and breast bone, together with the dried blood, make an especially fine stock food and egg producer for poultry.

After a thorough cleaning the birds are placed in cold water at a temperature of about 40 degrees Fahrenheit. Following this cold bath the birds are inspected and the breast bones removed. I consider this an important step in my process, for without the removal of the breast bone, a pocket of blood will form under this bone which will, during the long cold storage period, tend to cause both discoloration and deterioration of the meat. Other bones in back of which the blood seems to form in pockets may also be removed.

After removing the breast bones, the fowls are placed in a centrifugal washer and thoroughly washed with water at a temperature of from 40 to 60 degrees Fahrenheit. After three washes usually the water no longer becomes discolored. This signifies that all blood has been removed. The fowls are left in the centrifugal dryer and rotated until they are thoroughly dry, care being taken not to so violently agitate them as to cause bruising.

After drying, each fowl is folded back to close the incision down the back so that air will be kept out of the inside of the carcass and the bird is wrapped in wax paper prior to being sent to the cold storage plant. When they are shipped I have found that packaging in metal prevents access being had to the fowls by vermin.

Poultry dressed in accordance with my novel process has the same distinct color of the dark and white meat which occurs in freshly killed birds. The flavor and tenderness is even improved over freshly killed birds, and standards of sanitary principles having been observed, it is thought that the birds will not only be more appetitzing, but more healthful.

The important step in my process is the removal of all the blood from the carcass prior to cold storaging. As a variation in the specific method which I have suggested for removing the blood, it will also be possible to place the fowls in a container and exhaust the air therefrom thereby inducing, through vacuum conditions, the free flow of blood from the circulatory systems of the birds.

Having thus described my invention, what I claim as new and desire to secure by Letters Patent, is:—

1. A process for dressing poultry and fowls prior to placing them in cold storage, which consists in killing the birds and exposing the jugular vein to allow the free flow of blood therefrom, allowing the birds to "kick out" during such period as will permit all free flowing blood to flow out, scalding the birds in an alkaline detergent solution, plucking the birds, removing the entrails, chilling the birds, removing the breast bones therefrom, then washing and removing the remaining blood from the carcasses, and drying the carcasses prior to placing them in cold storage.

2. A process for dressing poultry and fowls prior to placing them in cold storage, which consists in killing the birds and exposing the jugular vein to allow the free flow of blood therefrom, allowing the birds to "kick out" during such period as will permit all free flowing blood to flow out, scalding the birds, plucking the birds, removing the entrails, chilling the birds, removing the breast bones therefrom, then washing and removing the remaining blood from the carcasses, and drying the carcasses prior to placing them in cold storage.

3. A process for dressing poultry and fowls prior to placing them in cold storage, which consists in killing the birds and exposing the jugular vein to allow the free flow of blood therefrom, scalding the birds, plucking the birds, removing the entrails, chilling the birds, removing the breast bones therefrom, then washing and removing the remaining blood from the carcasses, and drying the carcasses prior to placing them in cold storage.

4. A process for dressing poultry and fowls prior to placing them in cold storage, which consists in killing the birds and exposing the jugular vein to allow the free flow of blood therefrom, removing the entrails, chilling the birds, removing the breast bones therefrom, then washing and removing the remaining blood from the carcasses, and drying the carcasses prior to placing them in cold storage.

5. A step in the process of dressing poultry and fowls prior to placing them in cold storage, which consists in mechanically exhausting the blood from the carcasses of the birds by centrifugal force.

6. A process for dressing poultry and fowls prior to placing them in cold storage, which consists in cleaning the birds, removing therefrom the breast bones and mechanically exhausting the blood from the carcasses of the birds.

7. A process for dressing poultry and fowls prior to placing them in cold storage, which consists in cleaning the birds, removing therefrom the breast bones and centrifugally exhausting the blood from the carcasses of the birds.

8. A step in the process of removing the blood from freshly killed poultry and fowls prior to placing them in cold storage, which consists in removing bones from the bodies of the birds behind which pockets of blood accumulate, and thereafter mechanically removing the blood.

9. A process for dressing poultry and fowls prior to placing them in cold storage which consists in cleaning the birds, splitting the birds down the back and removing the entrails and backbones thereof, and thereafter mechanically exhausting the blood from the carcasses of the birds.

10. A process for dressing poultry and fowls prior to placing them in cold storage, which consists in cleaning the birds, splitting the birds down the back, removing the entrails, the backbone and the breast bone to avoid the formation of blood pockets under said bones, and thereafter removing the blood from the carcasses of the birds prior to placing them in cold storage.

GEORGE C. F. BRUENS.